July 21, 1942.  C. E. BURKE  2,290,225

BAR SOLDER MOLD

Filed Sept. 30, 1941

INVENTOR.
BY Charles E. Burke
Wood, Arey, Herron & Evans
ATTORNEYS

Patented July 21, 1942

2,290,225

UNITED STATES PATENT OFFICE 2,290,225

BAR SOLDER MOLD

Charles E. Burke, Ludlow, Ky.

Original application February 21, 1940, Serial No. 320,147. Divided and this application September 30, 1941, Serial No. 413,013

6 Claims. (Cl. 22—149)

This invention relates to molds for casting solder bars and is directed particularly to a new and improved mold for manufacturing solder bars having special structural characteristics which adapt them to be used more fully and expediently than conventional bars.

Large quantities of solder are used today in filling dents in automobile bodies. The usual practice is to pound out the parts, bringing the surface back to its original shape as nearly as possible. Thereupon, the remaining dents are filled with solder. It will be appreciated that this method of rebuilding metal surfaces requires the application of great quantities of solder. For quick application a blow torch is used to melt the solder. Since solder is a good conductor of heat it is impossible for the operator to hold the bar in his hand when it becomes short. Also, the torch flame must be directed dangerously close to the workman's hand when the bar is short. Some operators grasp the stub in pliers or, in some instances, heat resistant handles are attached to the bars. In most instances the stub is worth less than the trouble it caused and is thrown away and thus wasted.

The present inventor has discovered a simple means for using all of the solder of the bar. It is his concept to provide each bar with a tapered plug at one end and a correspondingly tapered socket at the other end. Thus, before a bar melts down to a point where it is difficult to hold, a fresh bar is attached to it and the work continued with the fresh bar serving as a handle for the stub. The plug and socket joint between the two bars fuses as the stub melts. In this way, the two joined bars become one and there is no waste.

It has been the primary object of the present inventor to provide a simple mold for casting these plug and socket type solder bars whereby they can be manufactured in quantities at a low price.

More particularly, it has been the object of the present inventor to provide a mold for casting these solder bars which mold operates in a simple manner for forming the attaching means at the ends of the bars and which permits quick displacement of the bars from the mold after they are formed.

This invention, disclosed and claimed herein, was originally disclosed in this inventor's copending application Serial No. 320,147, filed February 21, 1940, and accordingly, the present application constitutes a division of this earlier application.

Other objects and further advantages will be more fully apparent from the accompanying drawing, in which.

Figure 1:
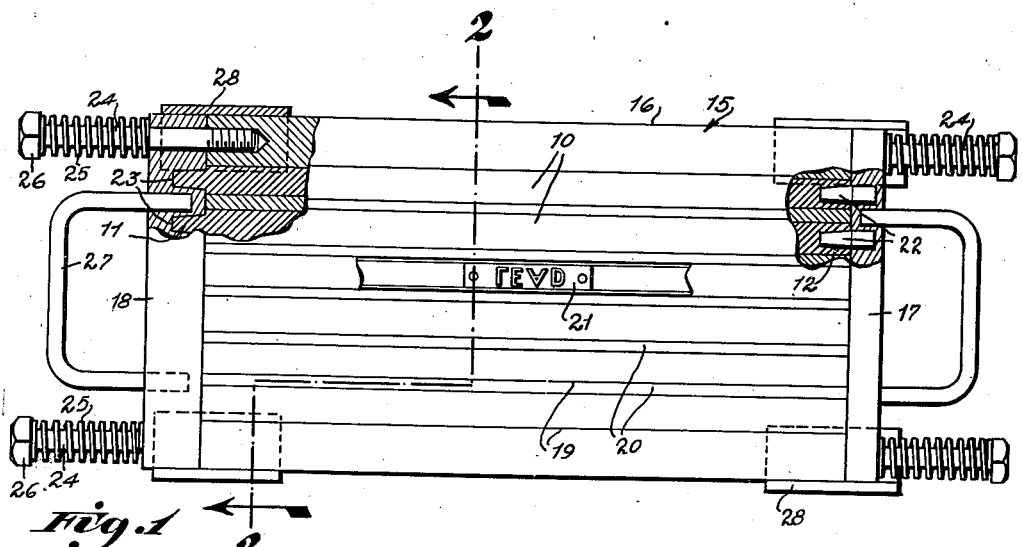
Figure 1 is a top plan view of the mold with solder bars poured therein, portions of the mold and bars being broken away for more fully illustrating the construction.
Figure 2:
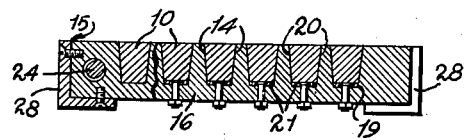
Figure 2 is a sectional view taken on line 2—2, Figure 1, showing the bars in cast position in the mold.
Figure 3:
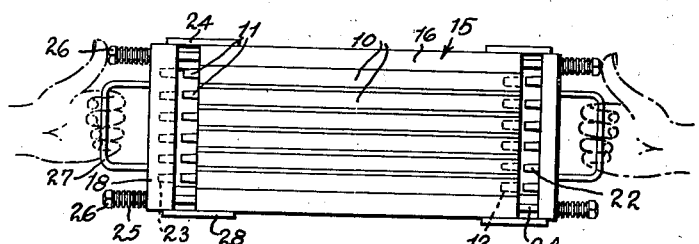
Figure 3 is a view similar to Figure 1, but on a smaller scale, showing the manner in which the mold is operated for releasing the cast bars from the mold.
Figure 4:
Figure 4 is a perspective view of associated solder bars showing a used remnant attached to the end of a new or unused bar.

Referring to the drawing, the solder bars are indicated at 10. These bars, as stated, are approximately ten inches long. In the process of molding the bars, they are formed with attaching means at the ends thereof. In the embodiment disclosed, a plug and socket type of connection is provided. One end of the bar includes an axially projected plug or stud 11, and the other end an axially formed socket 12. The bar preferably is provided with sloping sides 14—14 which provide a bottom side of less width than the top side. Accordingly, the bars may be more conveniently extracted or displaced from the mold cavities, as will be more fully described hereinafter.

The mold is indicated at 15. Generally speaking, it consists of a main section or body 16 and end gates 17 and 18. The body element 16 includes a series of longitudinal grooves 19, which grooves constitute the mold cavities. As stated, these grooves have side walls 20 which converge toward the base so as to provide an appropriate draft for disengagement of the bars 10 from the cavities. Name plates 21 may be secured upon the bottom surfaces of the cavities, as indicated.

For the purpose of providing the socket and plug arrangement in the bars, the end gates are formed accordingly, and are movable endwise for clearance purposes. The end gate 17 includes a series of socket forming plugs 22, one for each mold cavity. These plugs provide tapered portions projecting axially or longitudinally into the sockets when the gate is in closed position for molding. The end gate 18, on the other hand, includes socket openings 23, one for each cavity, axially aligned with the plugs 22 and also tapered. When the solder is poured into the cavities it flows into the sockets 23 and around the plugs 22 and thus each bar is formed to provide a plug 11 at one end and a socket 12 at the other.

In order to pull the gates clear of the formed sockets and plugs, each gate is guided in edgewise movement on guide rods 24—24, one at each corner of the mold. These rods are screwed into the main element 16 to provide guides traversing and slidably mounting the end gates. Coil springs 25 under compression, are disposed on the rods between the head ends 26 of the rods and the end gates.

U-shaped handle elements 27 have their arm portions fixed in the respective end gates. The handle portion in each instance is wide enough to permit insertion of all of the fingers while the thumb is engaged against the head of one of the rods. Thus, a lever action may be employed through the hands to pull the gates away from the mold element whereupon, by inverting the mold element and if necessary, jarring the mold, the solder bars are dumped from the mold.

The end gates are guided in angle iron guides 28 fixed at each corner of the mold and engaging the bottom and ends of the end gates. These additional guides support the end gates against any lateral movement.

Having described my invention, I claim:

1. A mold for molding solder bars, comprising a main element provided elongated mold cavities therein, having open ends, end gates for closing said ends, and guiding means for said end gates, one end gate including sockets, one for each mold cavity, and the other gate including studs one for each mold cavity, the studs and sockets of respective mold cavities being coaxially disposed.

2. A mold for molding solder bars, comprising a main element providing elongated mold cavities therein, having open ends, end gates for closing said ends, said gates constructed and arranged to form attaching means on the ends of the bars whereby the bars may be connected.

3. A mold for molding solder bars, comprising a main element providing elongated mold cavities having open ends, end gates for closing said ends, guiding means for said end gates consisting of rods extending from the main element, springs for holding said gates in closed position against the ends of the molds, handles on the gates, and means on the gates for forming connecting means on the ends of the bars whereby they can be joined end to end in use.

4. A mold adapted to form solder bars of the type having component attaching means at the respective ends thereof, said mold consisting of a body having a multiplicity of mold cavities therein into which the material forming the bars is poured, and displaceable means for forming the component attaching means at the respective ends of the bars.

5. A mold for forming solder bars of the type having component attaching means at the respective ends thereof, said mold consisting of a body providing a multiplicity of grooves into which the solder material is poured, and gates associated with the body and adapted in conjunction with the body to form the component attaching means, said gates being displaceable for clearing the formed component attaching means, whereupon the bars of solder may be released from the mold.

6. A mold adapted to form solder bars of the type having component attaching projections and sockets at the respective ends thereof, said mold consisting of a body having a multiplicity of mold cavities therein into which the material forming the bar is poured, and means on the mold body for forming the component attaching projections and sockets at the respective ends of the bars, said means being movable relative to the body for clearing said projections and sockets.

CHARLES E. BURKE.